(12) United States Patent
Chojnowski et al.

(10) Patent No.: US 9,062,463 B2
(45) Date of Patent: Jun. 23, 2015

(54) CONSTRUCTION SET FOR COVERING SUBSTRATE, IN PARTICULAR FLOOR SUBSTRATE

(71) Applicants: Adam Chojnowski, Wolomin (PL); Piotr Pawel Chojnowski, Wolomin (PL)

(72) Inventors: Adam Chojnowski, Wolomin (PL); Piotr Pawel Chojnowski, Wolomin (PL)

( * ) Notice: Subject to any disclaimer, the term of this patent is extended or adjusted under 35 U.S.C. 154(b) by 0 days.

(21) Appl. No.: 14/085,374

(22) Filed: Nov. 20, 2013

(65) Prior Publication Data

US 2014/0150367 A1 Jun. 5, 2014

(30) Foreign Application Priority Data

Dec. 4, 2012 (PL) .......................................... 401893

(51) Int. Cl.
| | |
|---|---|
| *E04F 15/02* | (2006.01) |
| *E01C 5/00* | (2006.01) |
| *E01C 5/14* | (2006.01) |
| *E01C 5/20* | (2006.01) |
| *F16B 5/06* | (2006.01) |

(52) U.S. Cl.
CPC ........... *E04F 15/02044* (2013.01); *E01C 5/005* (2013.01); *E04F 15/02183* (2013.01); *E04F 2201/05* (2013.01); *F16B 2005/0678* (2013.01); *E04F 2015/02116* (2013.01); *E01C 5/14* (2013.01); *E01C 5/20* (2013.01)

(58) Field of Classification Search
CPC ................ E04F 15/02044; E04F 2015/02116; E04F 2201/05; E01C 5/14; E01C 5/20; E01C 5/005
USPC .............. 52/385, 386, 391, 392, 582.1, 582.2
See application file for complete search history.

(56) References Cited

U.S. PATENT DOCUMENTS

| | | | | |
|---|---|---|---|---|
| 841,998 | A * | 1/1907 | Mulford | 52/584.1 |
| 3,676,971 | A * | 7/1972 | Dombroski | 52/603 |
| 3,731,445 | A * | 5/1973 | Hoffmann et al. | 52/391 |
| 3,862,874 | A * | 1/1975 | Hopper et al. | 428/47 |
| D470,039 | S * | 2/2003 | Pelc | D8/382 |
| 7,874,113 | B2 * | 1/2011 | Eberle, III | 52/403.1 |
| 8,336,278 | B2 * | 12/2012 | Smith et al. | 52/747.12 |
| 2008/0250744 | A1 * | 10/2008 | Hrovath et al. | 52/582.1 |

FOREIGN PATENT DOCUMENTS

| | | | | |
|---|---|---|---|---|
| DE | 20307074 | U1 * | 10/2004 | E04F 15/02 |
| DE | 103 23 916 | A1 | 12/2004 | |
| DE | 102008053230 | A1 * | 5/2010 | E04B 1/61 |
| EP | 1691002 | A2 * | 8/2006 | E04F 13/08 |
| EP | 2 278 092 | | 1/2011 | |
| FR | 2691491 | A1 * | 11/1993 | E04F 15/04 |
| PL | 388172 | | 12/2010 | |
| SE | WO 9627719 | A1 * | 9/1996 | E04F 15/02 |

* cited by examiner

*Primary Examiner* — Adriana Figueroa
(74) *Attorney, Agent, or Firm* — Ostrolenk Faber LLP

(57) ABSTRACT

The present disclosure refers to a construction set for covering a substrate, in particular a floor substrate, comprising plate structural elements for covering the substrate, and connecting elements for joining together the neighbouring plate elements, optionally while preserving a fixed distance between them to form a dilatation gap, characterized in that the connecting elements (4) comprise at least two, located on a base (5), assembly protrusions (6) seated in the neighbouring, connected plate elements (1) equipped on their substrate side with identical assembly sections (2) comprising at least one drilled assembly hole (3), and in the holes (3) there are seated, by means of the assembly protrusions (6), the connecting elements (4) joining the neighbouring plate elements (1).

5 Claims, 16 Drawing Sheets

Section B-B

Section C-C

CONSTRUCTION SET FOR COVERING SUBSTRATE, IN PARTICULAR FLOOR SUBSTRATE

TECHNICAL FIELD OF THE INVENTION

The invention refers to a construction set for covering a substrate, in particular a floor substrate, e.g. terrace floors, garden sheds, parts of gardens, bathing premises, or recreational elements at edges of swimming pools or other water containers. The construction set, upon some adapting, can also be used for other purposes e.g. for elevation finishing.

BACKGROUND OF THE INVENTION

There are known floor systems assembled from repeatable elements, in particular terrace floors made of wooden elements or of modified plastics, which require to be dimensioned depending on the floor size, and their assembly is difficult and usually time-consuming. Such systems are not designed for simple, do-it-yourself, repeatable assembly and disassembly.

Polish Patent Application P-388172 discloses a construction of terrace systems, in which drilling holes in a substrate and fixing load-bearing elements of the terrace by means of screws is necessary. In that system, dimensioning of individual floor elements, depending on sizes of the terrace or other substrate being finished, is also necessary. Although the floor elements themselves are "clasped" in a simple manner into connecting members that fix them, however a simple and fast disassembly of the connecting members and other load-bearing elements of the terrace floor is not possible.

German Patent Application DE10323916A1 discloses a system that consists in assembling floor elements by means of profiled connecting members that clip neighbouring floor elements. Connecting members are inserted into holes having suitably adjusted shapes that are drilled in the floor elements. Assembly and disassembly of the system is simple, however the system requires that holes having specific, rather complex shape, should be drilled in elements to be connected. In that system, identical floor elements are used, which makes it impossible to produce diverse floor patterns. Because of a shape of the connecting member that are used, it is also disadvantageous that assembly holes in floor boards are drilled from the bottom side and also from the edge side-thus the holes are visible from a side of the dilatation gaps, which has a negative impact on stability of wooden or wooden-like floor elements. The connecting elements in the system in question do not have any base, which would allow isolating the wooden floor elements from the substrate.

SUMMARY OF THE INVENTION

A construction set for covering a substrate, in particular a floor substrate, comprising plate construction elements for covering the substrate, and connecting elements for joining together the neighbouring plate elements, optionally while maintaining a fixed distance between them to form a dilatation gap (i.e. an expansion gap), according to the invention is characterized in that the connecting elements comprise at least two, located on a base, assembly protrusions seated in the neighbouring, connected plate elements equipped on their substrate side with identical assembly sections comprising at least one drilled assembly hole, and in the assembly holes, there are seated, by means of the assembly protrusions, the connecting elements joining the neighbouring plate elements, that preferably are cuboidal, having the identical thickness, wherein the length and/or width B of the plate elements is a function of a value A which is—upon subtracting the width of the dilatation gap C—a distance between the two neighbouring assembly sections located along the same flank of the plate element, and optionally also of the width of the dilatation gap C, so that the length and/or a width B of the plate elements is determined by the relationship $A+n(A+C)$, where n is equal to 0 or is a positive integer; and moreover along the flank of the plate element, a position of the assembly sections is determined according to the relationship $\frac{1}{2}A+n(A+C)$, so that each assembly section is within a constant distance from the nearest edge of the plate element in which it is located and in a fixed position in relation to the nearest assembly section of the neighbouring plate element, wherein the construction set comprises the plate elements having dimensions determined for at least some values of the parameter n and comprises also the assembly sections with positions determined for at least some values of the parameter n.

Preferably, each assembly section comprises one assembly hole or it is composed of two or three or four assembly holes, which preferably are drilled in a shape of hollow cylinders that are perpendicular to the operational surface of the plate element, and the assembly protrusions are in a shape of cylinders or in a shape of polyhedrons inscribed into cylinders having a diameter corresponding to a diameter of the assembly holes.

Preferably, each assembly section comprises one assembly hole, and the connecting element is equipped with two assembly protrusions.

The construction set of the invention is designed for fast and simple, optionally repeatable, self-assembly and self-disassembly, which does not require any special operations, like dimensioning of construction elements, drilling assembly holes etc. The plate elements included within the construction set, usually as cuboidal boards, are equipped with the assembly holes located on the substrate side (on the bottom side of the floor elements), which limits the moisture penetration into the interior of these holes, because in these holes the connecting elements are seated. Such location of holes within the plate elements improves also aesthetics of the combined floor elements—side edges of the plate elements that are visible in the dilatation gaps do not have any drilled fragments (they are not damaged). The construction set comprises the connecting elements that have a base on which the floor elements are supported and which isolates these floor elements from the substrate—it is possible to eliminate the direct contact between the floor elements and the substrate.

The construction set of the invention makes it possible to assemble the floor elements without damaging the substrate while drilling holes or during other type of mechanical treatment. Thanks to it there is no risk e.g. of damaging the insulating coats on terrace substrates or other surfaces onto which the elements of the construction set are placed.

The modular set as described makes it possible to assemble the floor in a floating system (the floor freely lies on the substrate, i.e. it is by no means joined to the substrate). This makes it possible to lay floor terrace also in a place where there is a ready floor of another type e.g. ceramic tiles permanently fastened with glue. Particular elements of the floor covering (plate floor elements) can be easily replaced if they are damaged.

BRIEF DESCRIPTION OF THE DRAWINGS

The subject of the invention is shown in an embodiment on a drawing, on which

DESCRIPTION OF PREFERRED EMBODIMENTS

Figure 1:
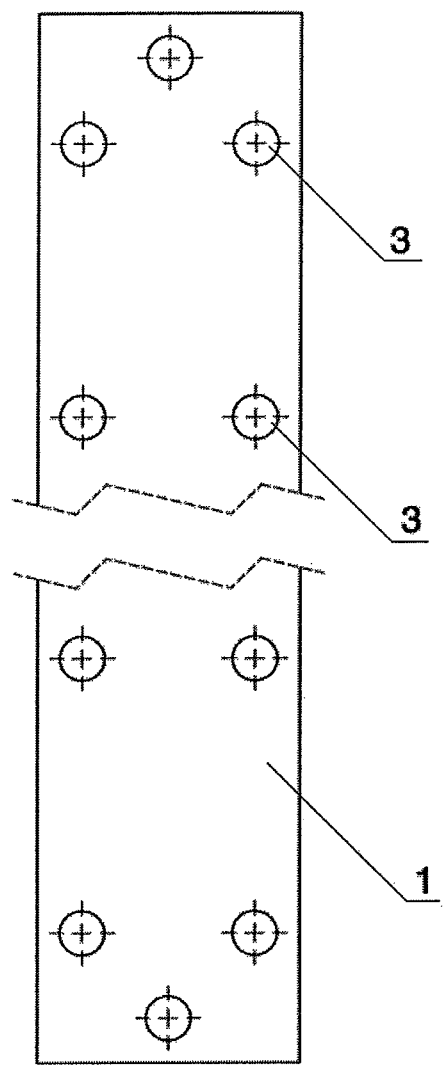
FIG. 1 presents a cuboidal plate element of the construction set as seen from the substrate side (the assembly holes are shown), FIG. 2—a parallel putting-together of several plate elements, FIG. 3—a plate element with a shown course of a reference line (network of the reference lines), which defines location of assembly sections on a plate element, is shown, FIG. 4—perpendicular putting-together of several plate elements joined by connecting elements is shown, and on FIG. 5—detailed view of the fragment "S" of FIG. 4, FIG. 6—putting-together of plate elements, which can have varying (increasing) dimensions of both width and length, FIG. 7—an assembly section (oval dashed line) having a round hole, located on a reference line is shown, FIG. 8—an assembly section having an analogous hole but shifted in relation to the reference line is shown, FIG. 9—an assembly section including two assembly holes located on two sides of the reference line is shown, FIG. 10—an assembly section having an assembly hole exhibiting an oval cross section, located on the reference line is shown, FIGS. 11A and 11B, 12A and 12B, 13A and 13B, 14A and 14B, 15A and 15B, 16A and 16B, 17A and 17B, 18A and 18B, various variants of embodiments of connecting elements in a perspective view and a schematic view from above are presented, FIG. 19A, B, C, D—an element connecting neighbouring plate elements in an embodiment when it is composed of parts, i.e. from the base and the assembly protrusions fastened to the base, is shown, and FIG. 19A—such variant of the connecting element is shown schematically in a top view, FIG. 19B—cross section B-B of such element is presented, FIG. 19C section A-A, and FIG. 19D spatial arrangement of several connecting members and two plate elements in the embodiment variant mentioned above are shown.
Figure 2:
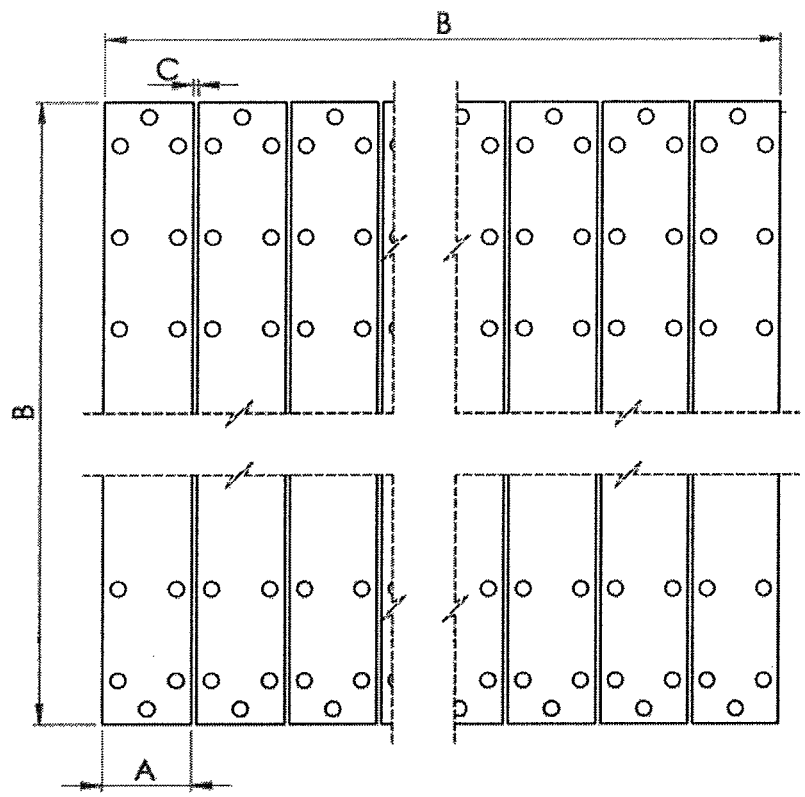
Figure 3:
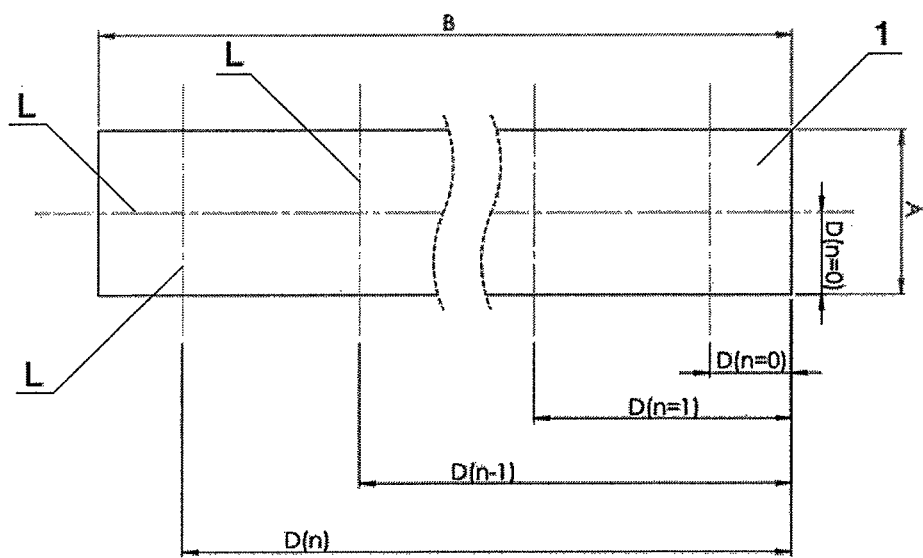

The modular set of the invention comprises plate elements 1, having shape of cuboids and connecting elements (connecting members) 4, the plate elements are equipped on the substrate side with the identical assembly sections 2, and each of these sections comprises at least one concave assembly hole 3, into which (i.e. holes) convex assembly protrusions 6 of the elements connecting the neighbouring plate elements 1 are seated. The assembly sections 2 on the plate elements and the assembly holes 3 in all plate elements preferably are identical.

The connecting element 4 comprises a base 5, equipped optionally with anti-sliding profiling 9, on which at least two identical convex assembly protrusions 6, preferably symmetrically, on opposite endings of the base 5, are located. The connecting elements 4 in such exemplary variant of embodiment are shown on FIGS. 11A and B, 13A and B and 14A and B. The assembly protrusions can be equipped on their side walls with longitudinal profiling 8.

The connecting element in the construction set of the invention constitutes a repeatable element, which is slid by "pushing-in" into neighbouring plate elements and does not involve any additional fastening. Stability of joining elements that connect with the plate elements is provided by adjusting sizes and shapes of assembly protrusions to a shape of assembly holes located in assembly sections of the plate elements. According to the simplest variant of embodiment of the invention, a connecting element includes two such assembly protrusions placed on a base. In such case each assembly section of a plate element includes one assembly hole and the connecting member spans neighbouring plate elements, i.e. one protrusion of the connecting member is placed in one plate element, while the second one—in the neighbouring plate element.

Figure 15A:
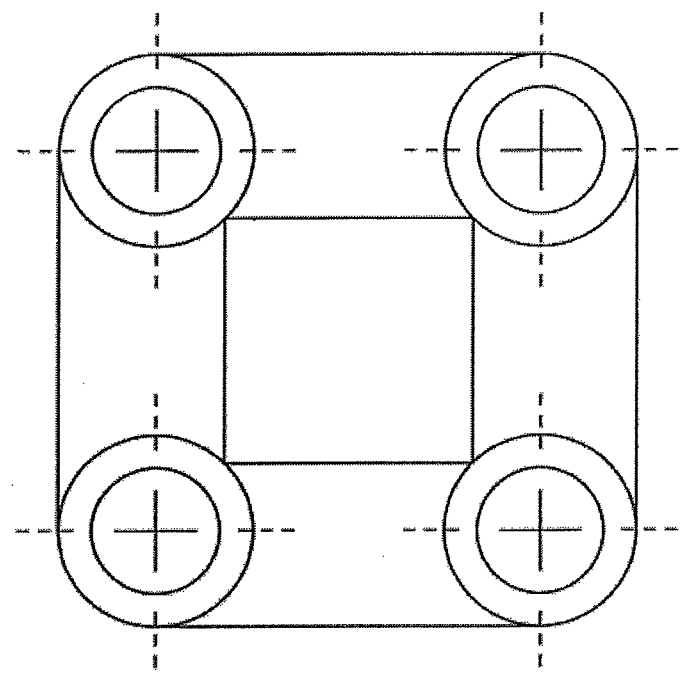
Figure 15B:
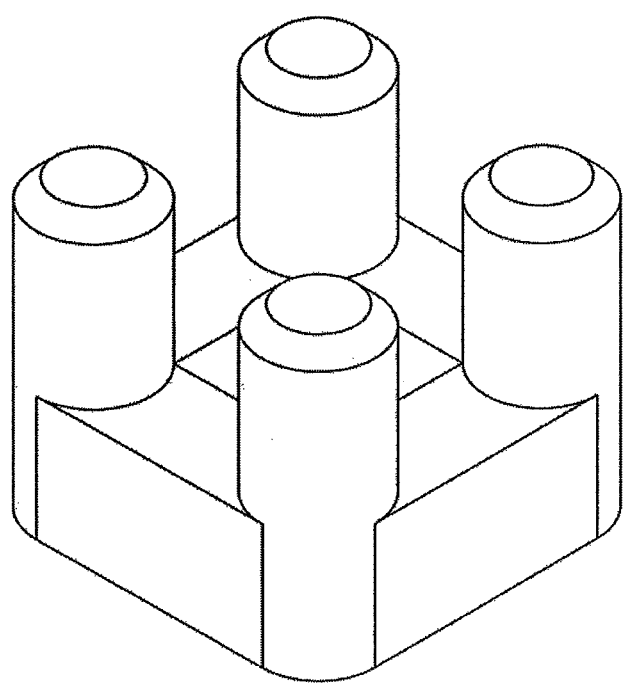
Figure 17A:
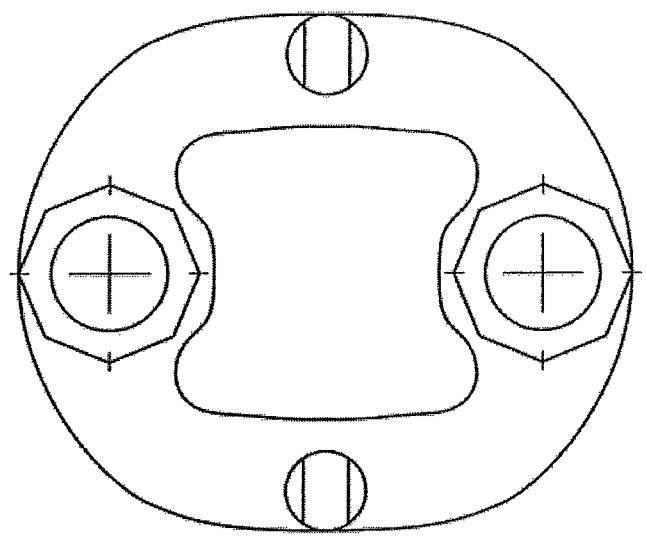
Figure 17B:
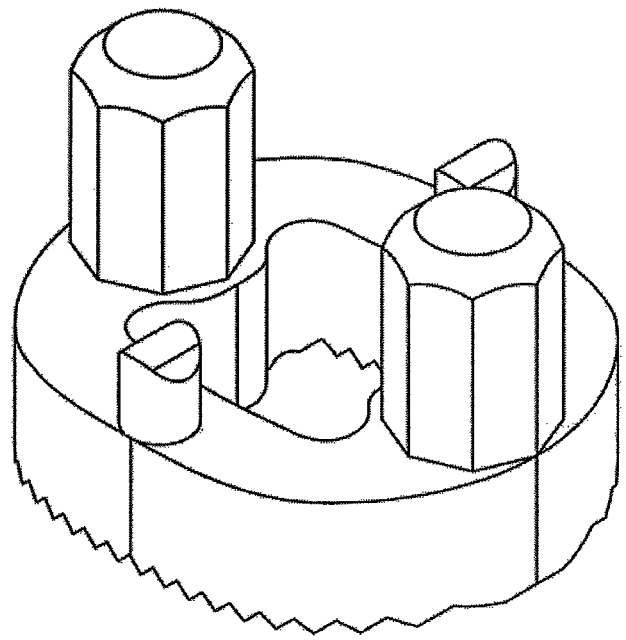
Figure 18A:
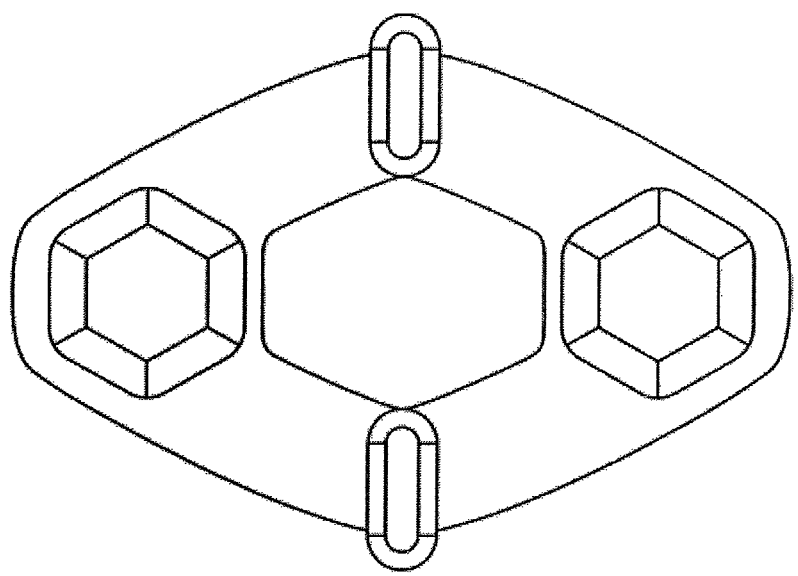
Figure 18B:
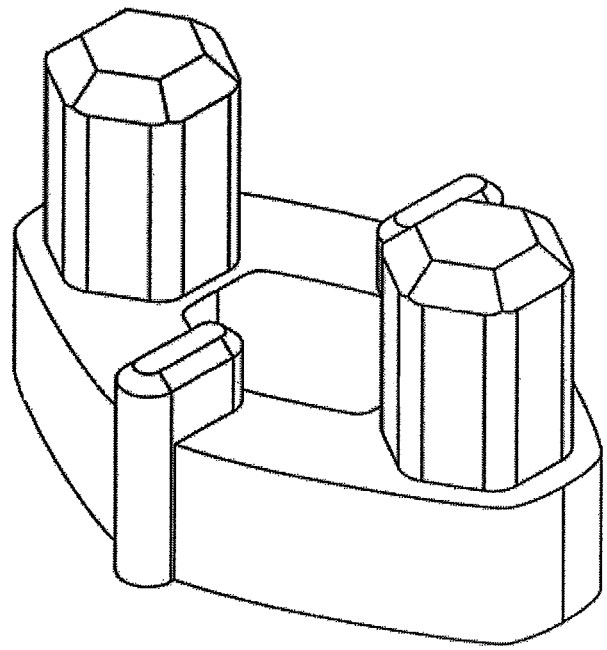
Figure 19A:
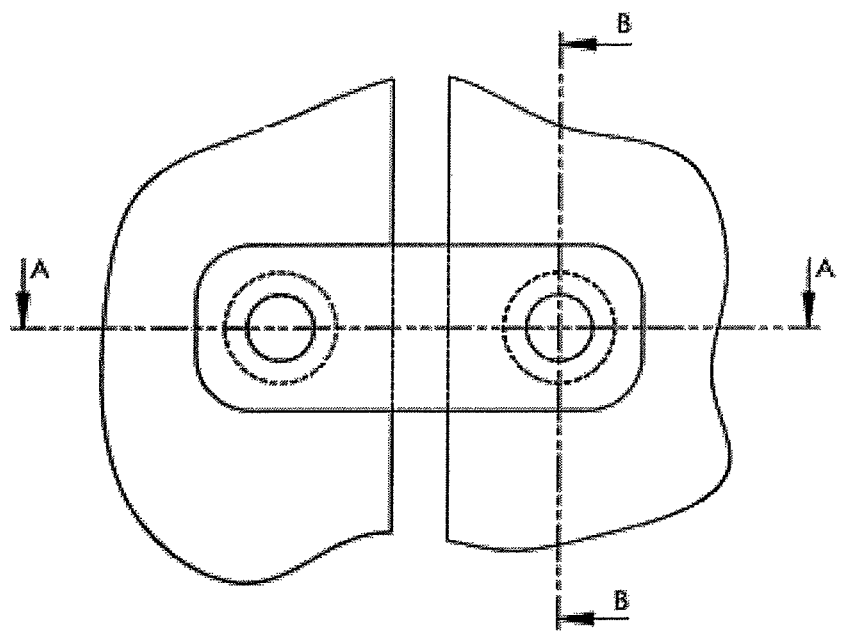
Figure 19B:
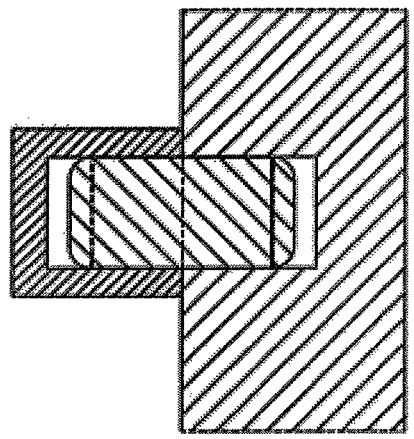
Figure 19C:
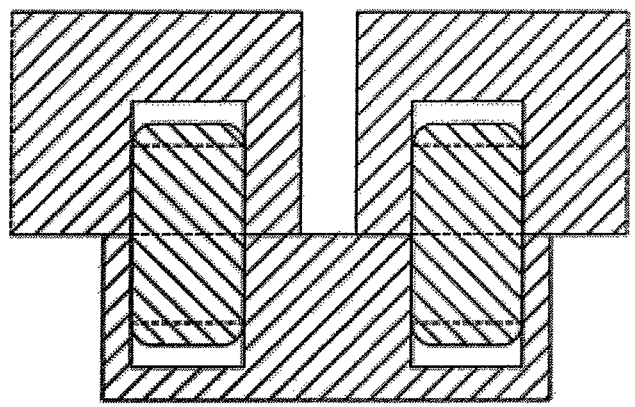
Figure 19D:
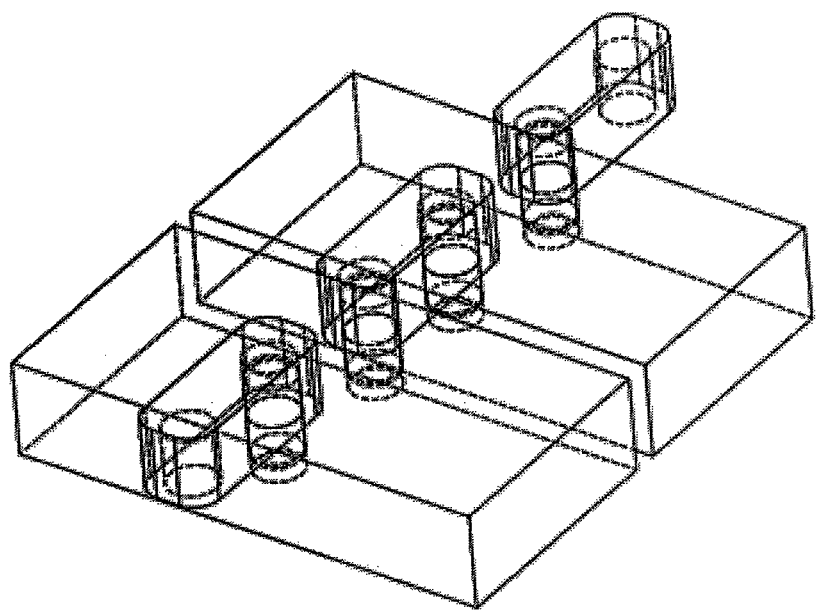

According to another exemplary embodiment, the connecting element can have more than two assembly protrusions, e.g. four protrusions, two of them being placed in an assembly section of a plate element, i.e. two protrusions are seated in the assembly holes of one plate element, whereas opposite two protrusions are seated in another plate element neighbouring the first plate element. Such variant of embodiment of the connecting element is shown on FIGS. 15A and B, and 16A and B. The connecting element 4 can be additionally equipped with the positioning protrusions 7, which—upon its seating in plate elements—are placed in dilatation gaps, additionally arranging the whole arranged construction of the floor in a proper location and stabilizing it. The connecting elements in such exemplary embodiment with the additional positioning protrusions 7 are shown on FIGS. 11A and B, FIGS. 17A and B, and FIGS. 18A and B. It will be obvious for a person skilled in the art that the positioning protrusions can have various shapes, limited only by the fixed goal—their size will result from a size of the dilatation gap maintained between the neighbouring plate elements. The connecting element can also be equipped with one positioning protrusion or three positioning protrusions.

Figure 16A:
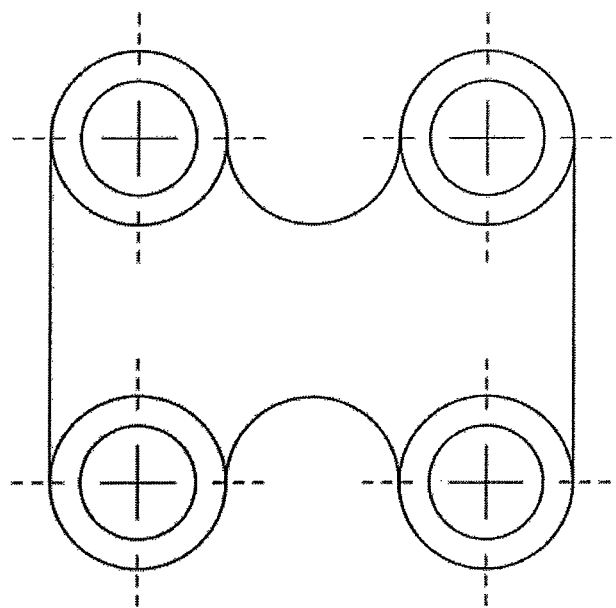
Figure 16B:
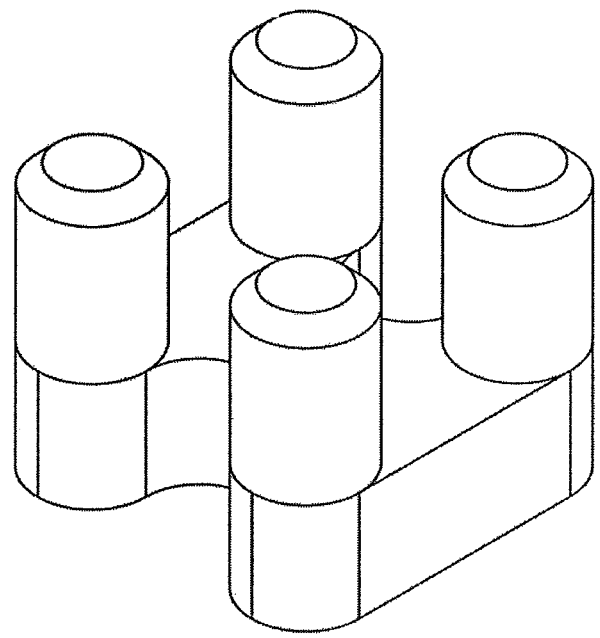

The connecting elements presented above, equipped with more than two assembly protrusions, i.e., e.g. four assembly protrusions (FIGS. 15A and 16A) can also be used for constructing the set, in such a way, that they connect more than two neighbouring plate elements, e.g. four plate elements—then each of the four assembly protrusions is placed in an assembly hole of another neighbouring plate element.

On FIGS. 19A, 19B, 19C and 19D, the connecting element in a still another variant of embodiment is shown. It does not constitute a homogeneous element, as those described above, but it is composed of a separate base, in which assembly protrusions (here as cylindrical pinholes) are fastened and only in the second step, the connecting element is placed in the plate elements. According to such variant of embodiment, the base includes the holes for seating the assembly protrusions. Such structure of the connecting member does not change its basic functions consisting in connecting the neighbouring plate elements by seating the assembly protrusions into the assembly holes.

Figure 9:
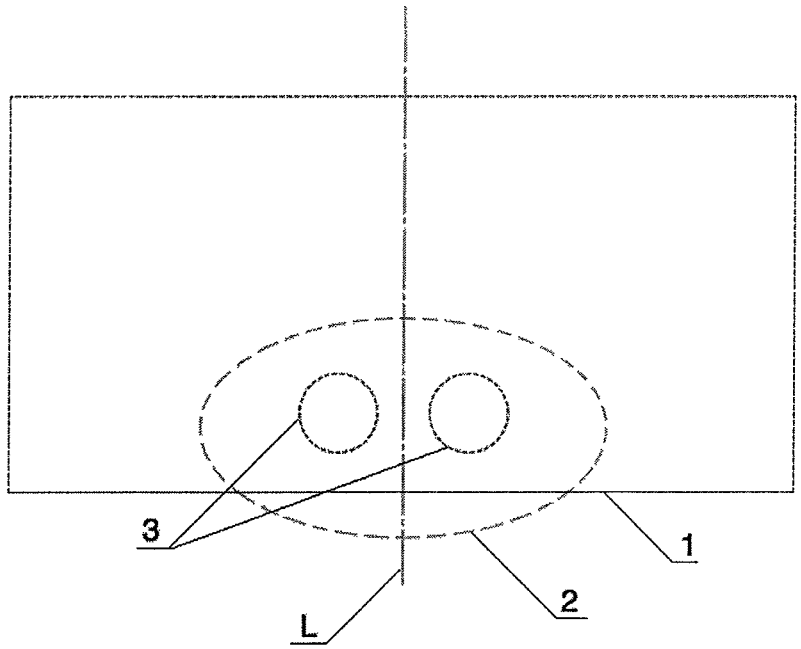
Figure 10:
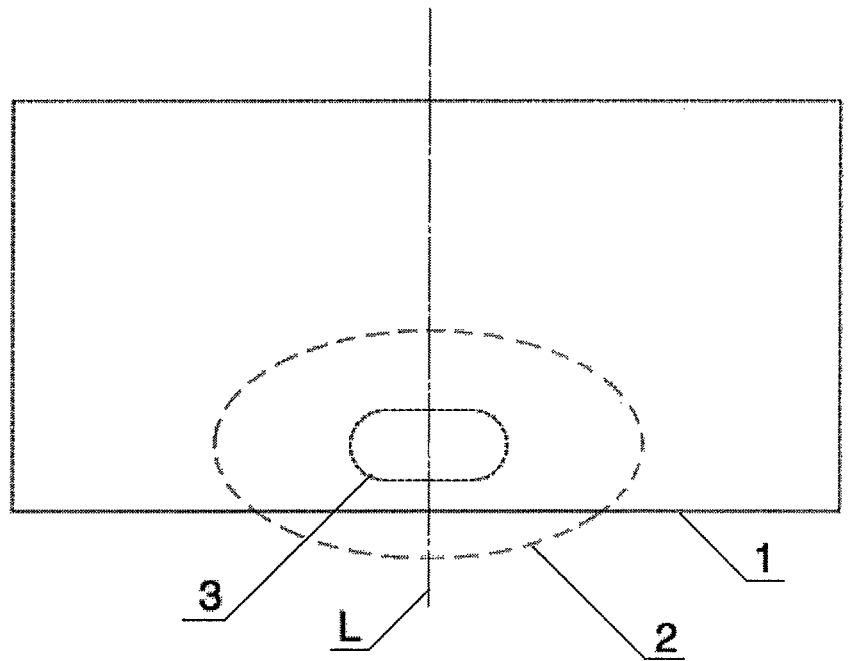
Figure 11A:
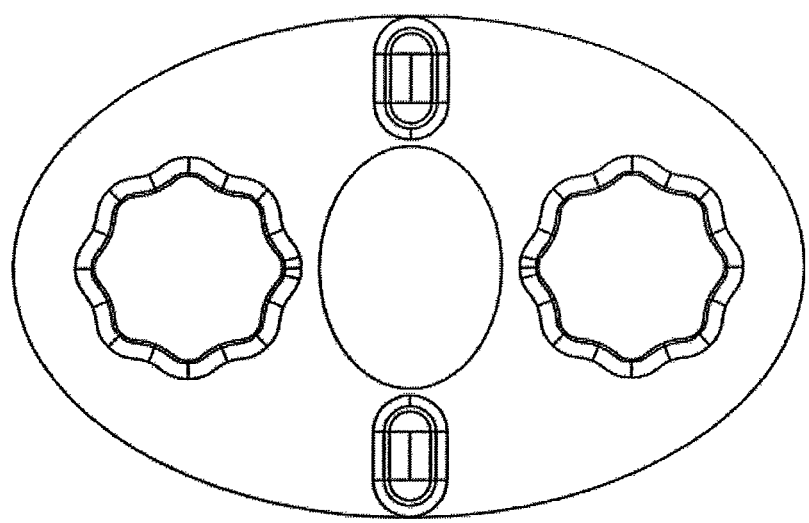
Figure 11B:
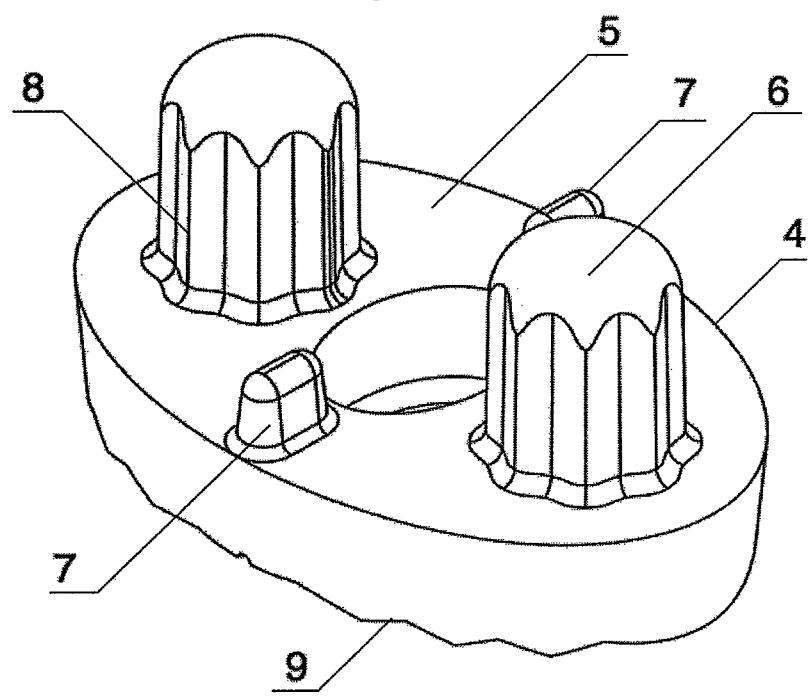
Figure 14A:
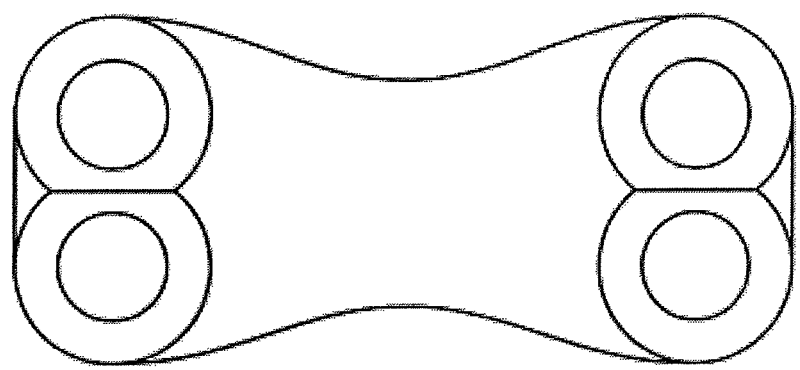
Figure 14B:
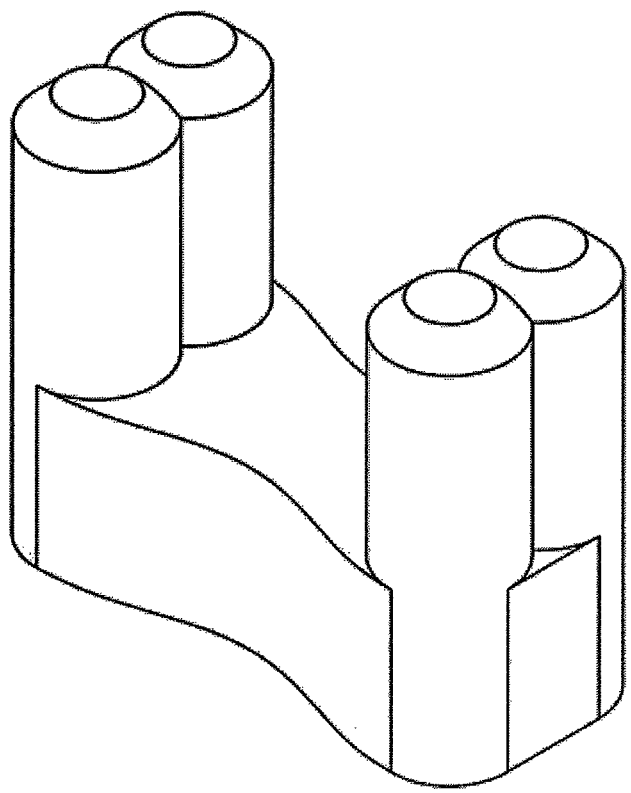

On FIGS. 11A and B to 19A-C, various exemplary variants of shaping of the connecting elements—i.e. various exemplary shapes of a base for connecting elements and various shapes of assembly protrusions—are shown. It will be obvious for a person skilled in the art that the convex assembly protrusions included in the connecting element interact with the concave assembly holes drilled in the plate elements, thus it is possible to match freely shapes of these set elements, the adjusting a hole size to a size of the assembly protrusion being the limitation. Such adjusting do not necessarily corresponds to the ideal conformity of shapes, but it is a possibility of assembling these elements by means of "pushing-in". Thus, e.g. protrusions having polygonal cross section (e.g. approximately octagonal) shown on FIGS. 11A and B can interact with holes having a circular cross section (FIG. 1), whereas protrusions shown on FIGS. 14A and B can interact with ellipsoidal holes (FIG. 10), and protrusions located in pairs (2×2) on the base for the connecting element, as are shown on FIGS. 15A and B, will interact with holes similarly arranged in pairs in assembly sections (FIG. 9). The assembly protrusions can have also a shape having triangular, square or polygonal (e.g. hexagonal or octagonal) cross section, circular or ellipsoidal or even more complex cross sections. The assembly holes also can have similar diverse shapes. The base of the connecting elements can be square, rectangular, circular, ellipsoidal, rhomboidal etc. It can be equipped with additional holes or indents on side edges. The base of the connecting element is preferably wider than a diameter of the assembly protrusions, so to form a stable support for the plate elements upon their joining with the connecting elements.

Preferably, the assembly protrusions are equipped on their side walls with crimping (crimped profiling), which are located along side walls of a protrusion, perpendicularly to the base of a connecting element. Such shaping of the side walls of assembly protrusions prevents from moving around of that element in the assembly hole. At the same time, external walls of the protrusions more tightly stick to internal walls of the assembly holes and undesirable sticking out of protrusions during operation of the assembled floor is not possible.

In order to present the construction set of the invention in a detailed way in the present description, a term "an assembly section" was used, which should be understood as a repeatable area of a plate element, which comprises the assembly hole/holes and is designed for joining the plate element with the neighbouring plate elements by means of a connecting element that joins these neighbouring plate elements. According to the simplest embodiment, the assembly section comprises one assembly hole, preferably having a circular cross section, whereas in a more complex embodiment, the assembly section includes two or three assembly holes, which interact with two or three protrusions arranged on one side of the connecting elements. The assembly section may include holes directly drilled in the material of the plate element, but it may also consist of additional elements of the section, that is, in the plate element e.g. a space can be drilled out from the substrate side, into which, e.g. an element made of plastic (an assembly mortise) including smaller assembly holes, interacting with these assembly protrusions of the connecting elements, is slid or pasted. Such a solution can be especially advantageous, when assembly holes and assembly protrusions have a slightly more complex shape and optionally additional snap fasteners that position the assembly protrusions in a proper position in the assembly holes are present. Then, it is technologically justified to produce, e.g. from profiled plastic pieces, additional assembly mortises to be placed in the assembly sections of the plate elements. Such mortises are equipped with assembly holes and only these directly interact with protrusions of the connecting members.

Figure 8:
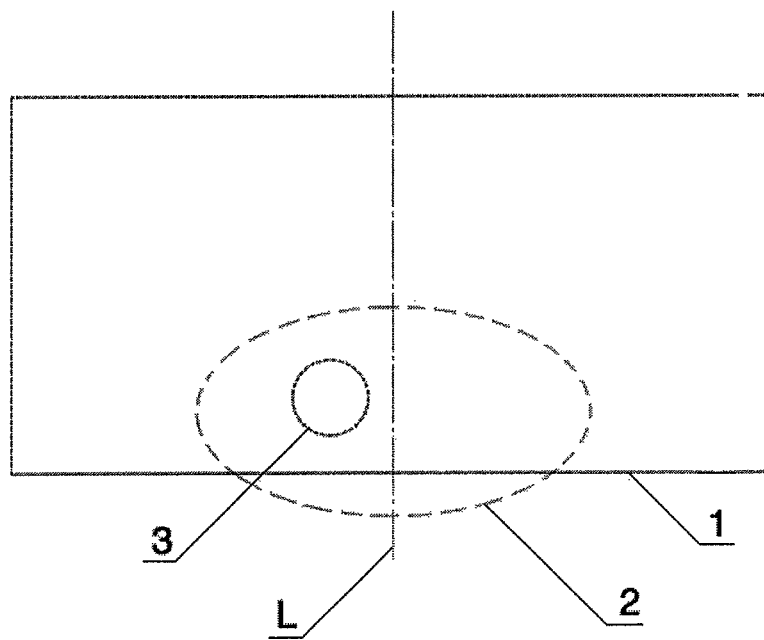

Location of the assembly holes in the assembly sections does not have to be symmetrical in its central part (this variant is shown on FIG. 8), yet in the plate elements, location of a hole or holes is repeatedly determined by auxiliary reference lines L, and arrangement of the holes with respect to these lines and to the neighbouring, joined by the connecting element, nearest assembly section, is the same. These parameters define at the same time sizes of the connecting members. Thus, the exact defining of location of the assembly sections and the assembly holes included therein, as described above, guarantees their interaction with the connecting elements. It is possible to develop such construction of the set that the assembly hole belongs at the same time to two assembly sections (i.e. the hole is common for two assembly sections). Then, the neighbouring assembly sections overlap each other.

The reference lines L guarantee that a network determining location of all possible assembly sections will be formed in the set assembled on the substrate. The lines run in parallel to two edges of the plate elements and perpendicularly to the remaining two edges of the plate elements. The reference lines intersect at the right angle. It is possible that, because of technological reasons, the plate elements will not be equipped with all determined assembly sections and assembly holes (i.e. some of them will be omitted). Such a situation is shown on FIG. 4 (the element on the right side of the drawing does not include all possible assembly sections)—in longer plate elements it is not necessary to place all possible assembly holes, yet the reference lines still function properly for the remaining plate elements of the set.

The set includes the plate elements having dimensions determined at least for some values of the parameter n and includes the assembly sections determined at least for some value of the parameter n, which means that the set may consist of elements of more and more longer for the subsequent values of the parameter n, as well as of identical plate elements determined for a specific selected value of the parameter n. Adjustment of length of the plate elements can be, e.g. determined for n=2, 4, 6 and for a constant width equal to A, or for length and width varying for n amounting from 1 to 5 etc. Similarly, with reference to the location of the assembly sections—the plate elements do not have to include the assembly sections for each subsequent value of n, but, e.g. a part of the sections may be omitted. Location of each section, if it exists, is calculated according to the given relationship, yet not all the determined positions must in fact include the assembly sections.

Figure 12A:
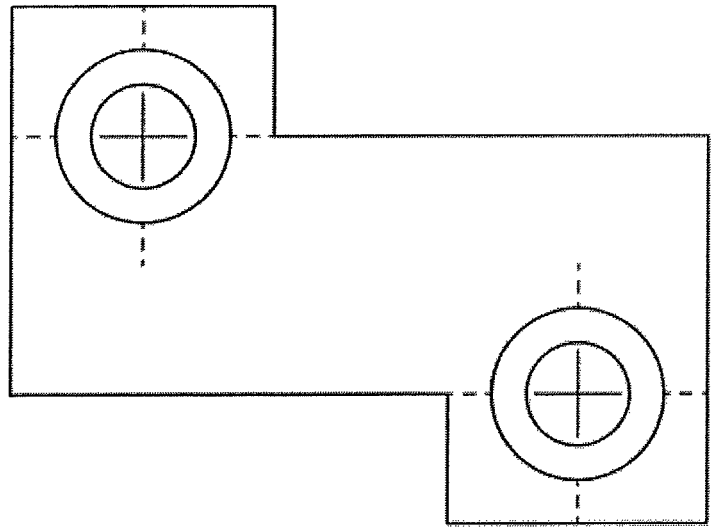
Figure 12B:
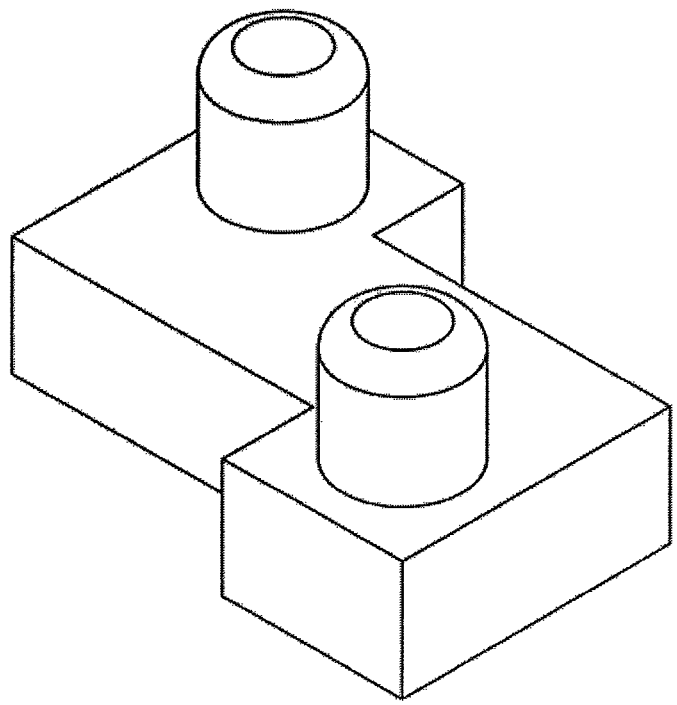
Figure 13A:
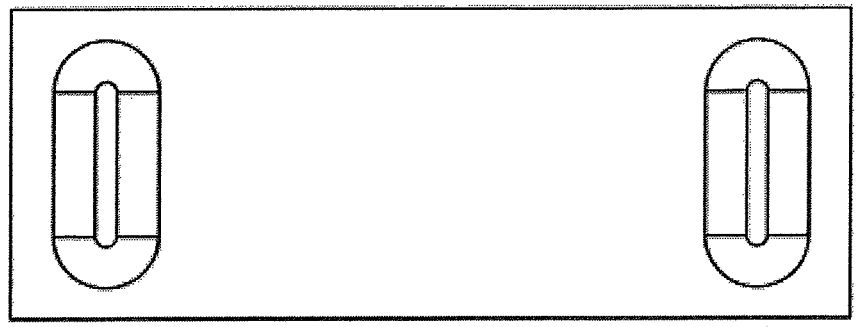
Figure 13B:
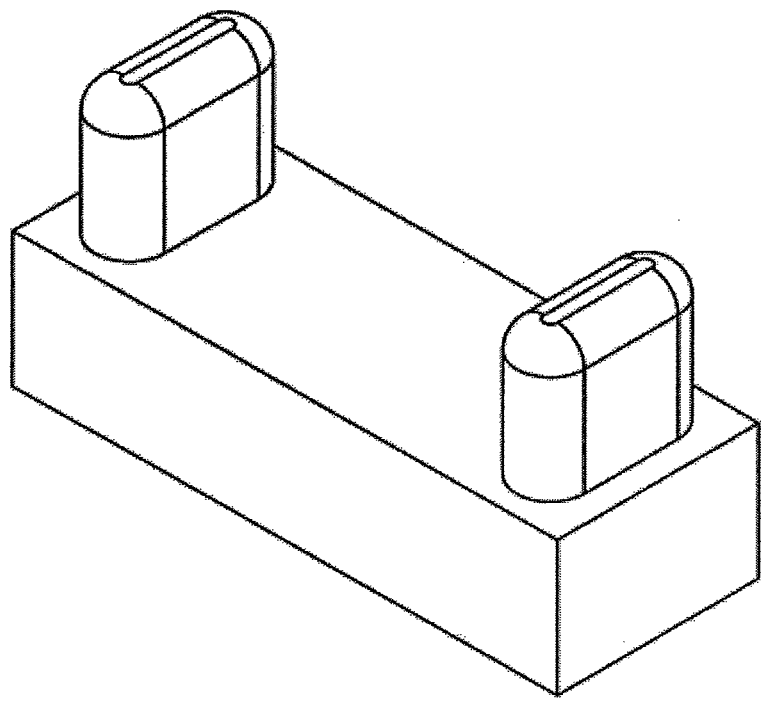

It is essential that the assembly holes do not have to be directly located on the reference line, as the reference lines determine location of the assembly section as a whole. If the section includes two assembly holes, they can be located symmetrically on both sides of the reference line, but they can also be shifted with respect to that line. It is thus possible that location of the holes with respect to the reference line is not symmetrical, but it is repeatable in each section and within the whole set. For example, such situation is shown on FIG. 8, where the assembly hole is shifted with respect to the reference line. All the assembly sections within the set will look the same—they will be shifted with respect to the reference line. In this case, a repeatable connecting element that interacts with the assembly sections of neighbouring plate elements can have a shape shown on FIGS. 12A and B.

Location of the reference line mentioned above within the set may be expressed with the following relationship:

$$D = \tfrac{1}{2}A + n(A+C),$$

where D denotes a distance of subsequent reference lines L from a parallel side of the first (boundary) plate element, A denotes a distance between the two neighbouring assembly sections, located along the same flank of the plate element, less a value of C, whereas C denotes a width of a dilatation gap, the value C may also be equal zero, and n is equal to zero or is a positive integer.

The reference lines mark out location of the assembly sections in such a way that the assembly sections are located along flanks of the plate elements, at distances $\tfrac{1}{2}A + n(A+C)$ from a flank of the plate element perpendicular to a flank, to which the assembly section adjoins, so that the location of the assembly holes of the assembly section in relation to the adjacent flank of the plate element is the same for each assembly section within the construction set. The opposite assembly sections in neighbouring plate elements are rotated by 180 degrees (an axle is perpendicular to the section plane) in relation to each other.

At the same time, the length of flanks of the plate elements are expressed by the relationship:

$$B=A+n(A+C),$$

where B denotes the length and/or width of the plate element, and A, C and n are as defined above.

According to the above, the construction set consists of the plate elements, in which sizes and location of the assembly sections and also—directly or indirectly—of the assembly holes on the plate elements are strictly determined—first of all it is a function of A—a distance between the assembly sections and optionally it also depends on the width of the dilatation gap D. Thanks to it, one can be certain that the plate elements combined together can be joined with the identical connecting elements, as the assembly sections at an edge of one plate element always neighbour with sections of the subsequent plate element. Because the distance of the assembly holes from the nearest assembly section is always the same, all the connecting members can have the identical size and identical arrangement of the assembly protrusions.

Figure 4:
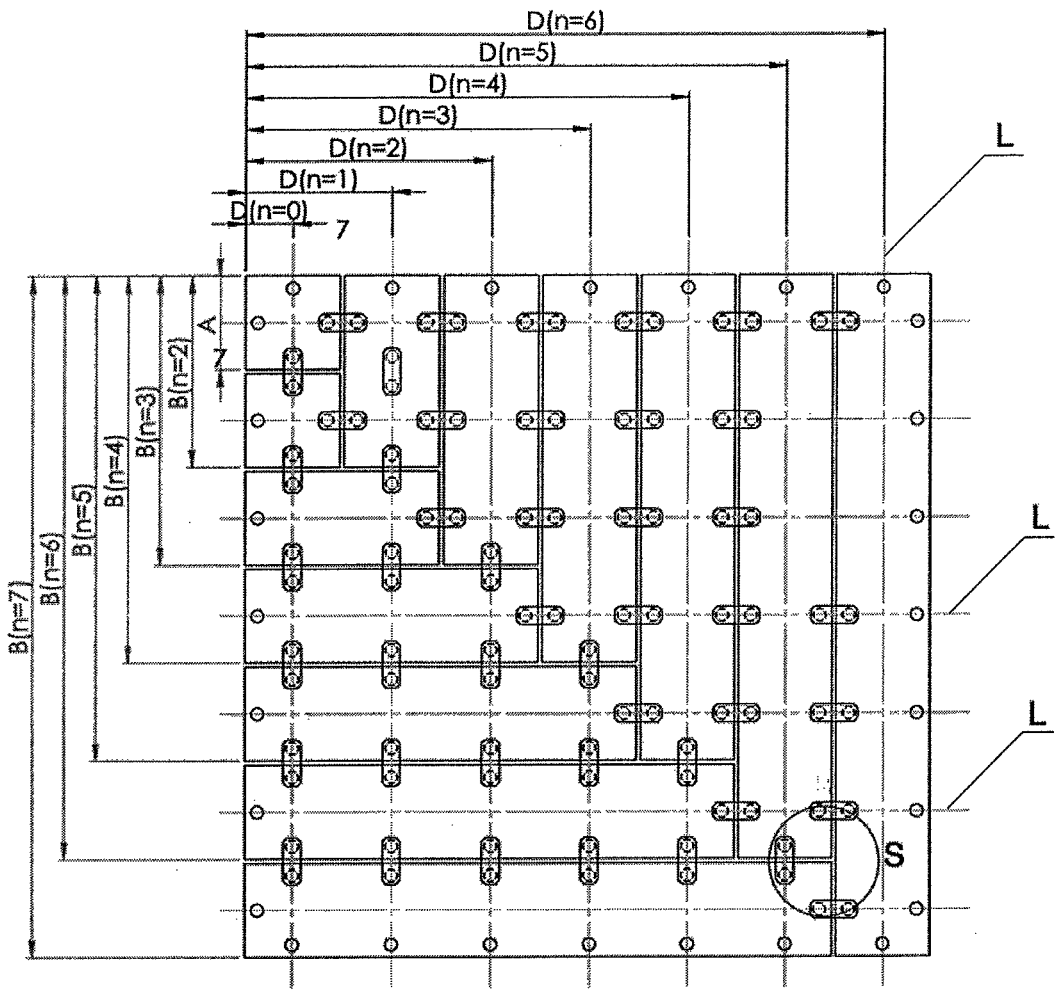
Figure 5:
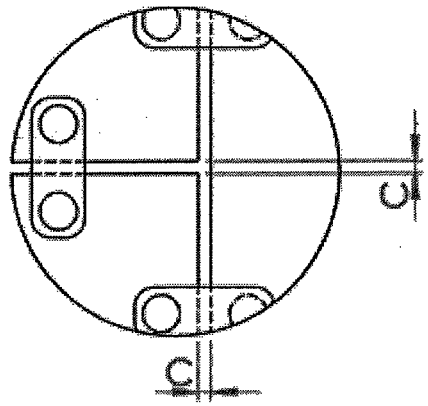
Figure 6:
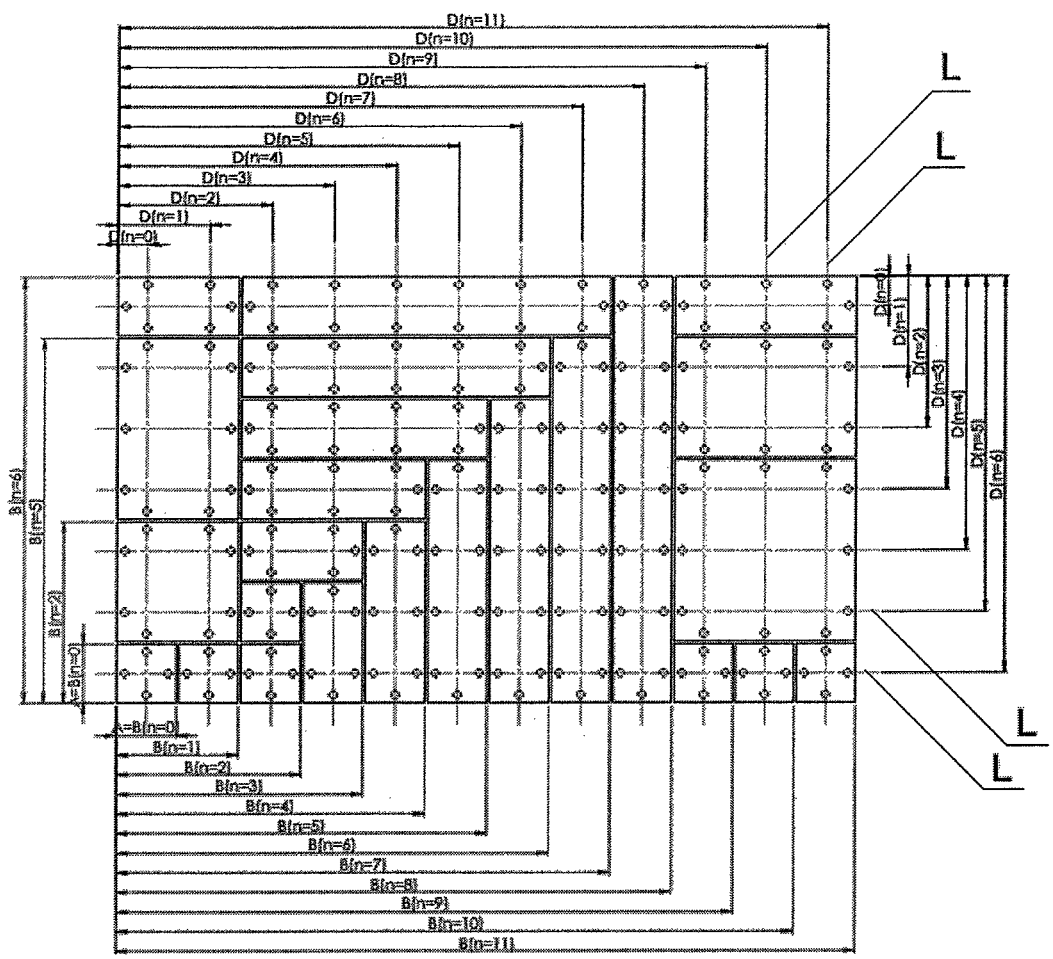
Figure 7:
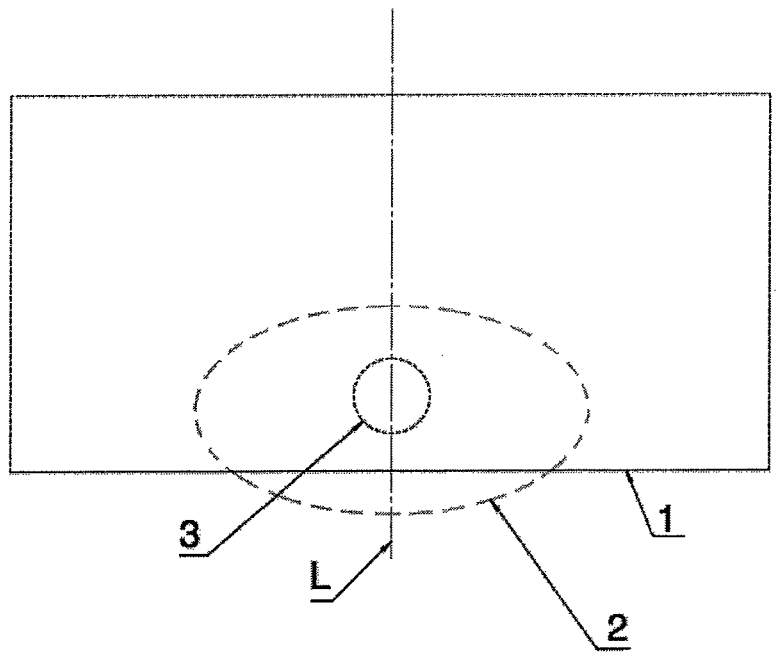

On FIGS. 4 and 6 exemplary arrangement of the set is shown, where the subsequent distances D and B obtained for a given value of A are shown. On FIG. 4 the set consisting of the plate longitudinal elements (having a shape of boards) is shown. The least square elements of the set have a width equal to their length amounting to A (B=A). In this case, the above given relationships that determine location of the reference line and a value of B constitute a function of the above given least width of a plate element A and of the gap D. On FIG. 6 the set including greater plate elements is shown, the both sides of which being a multiple of value of A and optionally of C. On FIG. 6 the set is shown in such embodiment that the plate elements are equipped with all the assembly sections determined according to the above given relationship, yet it is also possible that a part of the assembly sections will be omitted as it is shown e.g. on FIG. 4.

Through determination of the distance D, a network of subsequent reference lines L is established, which determines location of the assembly sections and—considering the simplest example (i.e. one symmetrical hole in each section)—also directly location of the assembly holes in the plate elements. In this way, it is shown that neighbouring plate elements have the assembly holes in such a way that they are at close vicinity to each other and are located always in the same way with respect to each other—so that the identical connecting members are used within the set.

All the elements of the construction set are preferably made of materials resistant to weather conditions. The connecting elements made of plastic, rubber, caoutchouc or their mixtures, from the substrate side through their base isolate the floor plate elements, lightly damp the whole assembled floor and prevent from capillary transferring of moisture to the interior, e.g. of the wooden floor elements. Thanks to that, they do not undergo deformation.

The plate elements, preferably wooden cuboidal boards (i.e. their upper surface has a shape of rectangle or square) may also be manufactured from wooden-like or wooden-derived materials, e.g. mixtures of plastics with sawdust or with wooden dust, or totally from plastics, preferably plastics that mimic wood, and from suitably shaped sheet metal. Preferably floor elements can be made from high-grade wood designed to be used outdoors. It can origin from exotic or European trees. The elements can be subject to any treatment during production to improve their quality and to enhance their resistance to weather conditions they can be e.g. oiled, impregnated or thermally modified (thermowood).

The plate elements of the floor covering can either be solid (i.e. without any hollow spaces/ducts inside) or they can include such empty spaces inside. The only limitation here is the necessity of making the assembly holes and stable fixing of the connecting members.

The plate elements can have various length and width.

Edges at the end of a surface of floor assembled from the set of the invention are made in such a way, that either half-connecting members are inserted into holes of extreme floor elements or finishing slats are inserted into a free end of typical connecting members.

According to the first variant of embodiment of the invention, the plate elements have a constant width A, which determines sizes of the remaining elements of the set, i.e., a width of all the elements is constant, amounting to A, and a length of the elements can be different and is a function of that parameter A and optionally of parameter D.

According to the second variant of embodiment of the invention, both width and length of the plate elements is variable, and it is a function of the same starting parameter A. In such variant of embodiment, the plate elements do not have to be shaped as longitudinal boards, but also as greater squares or rectangles (plates).

Such defining of sizes of the plate elements makes it possible to arrange floors in any aesthetic mosaic forms, which is shown e.g. on FIG. 6. The illustrated set includes the greater rectangular plate elements at the ends, whereas the remaining elements have a width equal to A (shape of longitudinal board).

The solution according to the invention comprises both of the above variants.

The construction set of the invention can be additionally reinforced by applying glue at places, where the connecting elements are inserted into the assembly holes. The glues can be typical glues used in such cases, e.g. silicone-based glues. Such additional gluing elements of the set seals microfissures and prevents from accessing the moisture to them.

What is claimed is:

1. A construction set for covering a substrate comprising: a plurality of plate elements and a plurality of connecting elements each connecting element being configured to couple at least two plate elements that are positioned adjacent one another while maintaining a dilation gap having a width (C) between the two coupled plate elements, wherein each plate element includes at least one assembly section that includes at least one assembly hole defined on one surface thereof which is designated to face the substrate in an assembled state, and wherein each connecting element comprises a base and at least two assembly protrusions on the base, each assembly protrusion being configured to be received and seated in an assembly hole defined in a plate element, wherein each plate element has a thickness, a width and a length, wherein all plate elements have a same thickness, and wherein the length or the width (B) of the plate elements is determined by the relationship A+n(A+C), where n is equal to 0 or is a positive integer, value (A) denotes a distance between two adjacent assembly sections, located along a same flank of a plate element less the width of the dilatation gap (C), wherein a position of the assembly sections is determined according to the relationship ½A+n(A+C), so that each said assembly section is within a constant distance from the nearest edge of the plate element in which it is located, and in a fixed position in relation to the nearest assembly section of an adjacent plate element in the assembled state, wherein the construction set comprises plate elements having dimensions determined for at least some values of the parameter n and comprises also the assembly sections with positions determined for at least some values of the parameter n.

2. The construction set according to claim 1, wherein each said assembly section comprises a plurality of assembly holes.

3. The construction set according to claim 1, wherein the assembly holes are hollow cylinders that are perpendicular to the surface designated to face the substrate, and the assembly protrusions are cylinders or polyhedrons inscribed into cylinders, each protrusion having a diameter corresponding to diameter of the assembly holes.

4. The construction set according to claim 1, wherein all plate elements are cuboidal.

5. The construction set according to claim 1, wherein the connecting elements are identical and the plate elements have identical assembly sections, and wherein the plate elements can be assembled into two or more configurations.

\* \* \* \* \*